(12) United States Patent  
Kleinmann (10) Patent No.: US 8,805,722 B1  
(45) Date of Patent: Aug. 12, 2014

(54) SYSTEM, METHOD AND COMPUTER PROGRAM PRODUCT FOR PROVIDING INFORMATION IN RESPONSE TO RECEIVING A PRODUCT IDENTIFIER

(75) Inventor: Amit Kleinmann, Tel-Aviv (IL)

(73) Assignee: Amdocs Software Systems Limited, Dublin (IE)

( * ) Notice: Subject to any disclaimer, the term of this patent is extended or adjusted under 35 U.S.C. 154(b) by 1533 days.

(21) Appl. No.: 11/395,714

(22) Filed: Mar. 31, 2006

(51) Int. Cl.  
*G06Q 30/00* (2012.01)

(52) U.S. Cl.  
USPC ................................. 705/14.53

(58) Field of Classification Search  
None  
See application file for complete search history.

(56) References Cited

U.S. PATENT DOCUMENTS

| | | | |
|---|---|---|---|
| 5,855,008 A * | 12/1998 | Goldhaber et al. | 705/14.1 |
| 7,080,030 B2 * | 7/2006 | Eglen et al. | 705/26 |
| 2002/0143618 A1 * | 10/2002 | Kenner et al. | 705/14 |
| 2003/0033292 A1 * | 2/2003 | Meisel et al. | 707/3 |
| 2003/0171984 A1 | 9/2003 | Wodka et al. | 705/14 |
| 2003/0206720 A1 * | 11/2003 | Abecassis | 386/83 |
| 2005/0246738 A1 | 11/2005 | Lockett et al. | 725/43 |
| 2005/0267820 A1 | 12/2005 | Zheng | 705/27 |
| 2006/0074769 A1 * | 4/2006 | Looney et al. | 705/26 |
| 2006/0129458 A1 * | 6/2006 | Maggio | 705/14 |
| 2006/0169772 A1 * | 8/2006 | Page et al. | 235/383 |

OTHER PUBLICATIONS

Defiler, Frank J. et. al. How Networks Work, Millennium Ed., Que Corporation, Jan. 2000. p. 41.*

* cited by examiner

*Primary Examiner* — Daniel Sorkowitz  
(74) *Attorney, Agent, or Firm* — Zilka-Kotab, PC (57) ABSTRACT

A system, method and computer program product are included for providing product-related information. In use, a product identifier associated with a product is received after a point of sale, where such product identifier is received utilizing a network. Further, information associated with the product is provided utilizing the network in response to the receipt of the product identifier.

19 Claims, 7 Drawing Sheets

SYSTEM, METHOD AND COMPUTER PROGRAM PRODUCT FOR PROVIDING INFORMATION IN RESPONSE TO RECEIVING A PRODUCT IDENTIFIER

BACKGROUND AND FIELD OF THE INVENTION

The present invention relates to information distribution, and more particularly to distributing information associated with products.

SUMMARY

A system, method and computer program product are included for providing product-related information. In use, a product identifier associated with a product is received after a point of sale, where such product identifier is received utilizing a network. Further, information associated with the product is provided utilizing the network in response to the receipt of the product identifier.

DETAILED DESCRIPTION

Figure 1A:
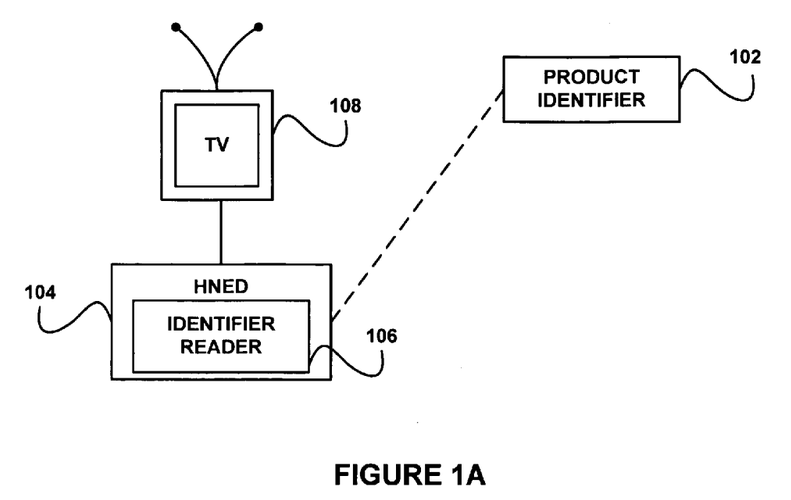
FIG. 1A illustrates an exemplary system for providing information in response to receiving a product identifier, in accordance with one embodiment.

FIG. 1A illustrates an exemplary system for providing information in response to receiving a product identifier, in accordance with one embodiment. As shown, a product identifier 102 is received at a home network end device (HNED) 104. The product identifier 102 may include a radio frequency identification device (RFID) tag that is coupled to a product.

For example, in one embodiment, the RFID tag may be located inside the product itself or on a label of the product. Optionally, in other embodiments, the RFID tag may be located on a sales receipt, coupon and/or promotional document associated with the product. Of course, the product identifier 102 may include any entity that is capable of identifying a product and further capable of being received at a device such as, but not limited to, the HNED 104. Further, in various embodiments, the HNED 104 that receives the product identifier 102 may include a television, a television set-top box (e.g. a cable box), and/or any other type of device capable of receiving a product identifier 102.

It should be noted that the product associated with the product identifier 102 may include any type of product with which content may be associated. Just by way of example, in one embodiment, the product may include self-assembled furniture with which instructional content for assembling the furniture is associated. Of course, other products may include, but are not limited to consumer electronics, clothing, toys, etc. Still yet, the content associated with the product may be any type of content capable of being reviewed by a user of the product, including but not limited to a website, television content, any other visual and/or audible content, etc.

With continuing reference to FIG. 1A, the HNED 104 may, in one embodiment, include an identifier reader 106. Of course, it should be noted that the HNED 104 could also be coupled to a separate identifier reader 106. Such identifier reader 106 may be utilized for receiving the product identifier 102 at the HNED 104.

In one embodiment, the identifier reader 106 may include a RFID reader, such that RFID tags associated with the product may be read and received at the HNED 104. The product identifier 102 may be used to identify associated content which, in turn, may be sent from the HNED 104 to a television 108 coupled to the HNED 104. The product identifier 102 may be used to identify the associated content using any one of various techniques, one of which will be set forth in greater detail during reference to FIG. 2. Of course, the aforementioned content may be sent from the HNED 104 to any type of device capable of receiving a product identifier, such as for example the networked devices described below with respect to FIG. 5.

Figure 1B:
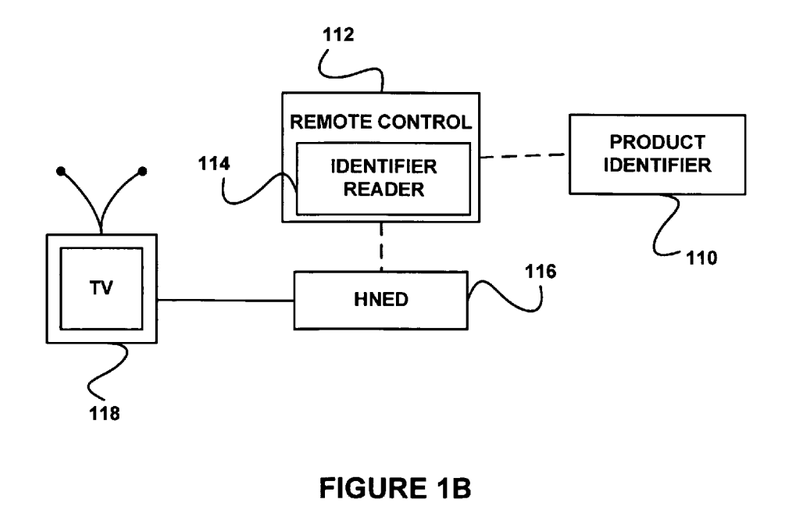
FIG. 1B illustrates an exemplary system for providing information in response to receiving a product identifier, in accordance with another embodiment.

FIG. 1B illustrates an exemplary system for providing information in response to receiving a product identifier, in accordance with another embodiment. The aforementioned definitions may equally apply to the description below.

As shown, a product identifier 110 is received at a remote control 112. Such remote control 112 may include an HNED remote control. Further, the remote control 112 may include an identifier reader 114, such as, for example, a RFID reader. Of course, it should be noted that the identifier reader 114 could optionally be coupled to the remote control 112, as a separate entity. As described above with respect to FIG. 1A, the identifier reader 114 may be utilized to read and receive the product identifier 110 at the remote control 112.

Once the product identifier 110 is received at the remote control 112 utilizing the identifier reader 114, the product identifier may be used to identify associated content which, in turn, may be sent from the HNED 116. From the HNED 116, the content may be sent to a television 118 and/or any other device capable of receiving the same. Thus, in accordance with the systems of FIGS. 1A and 1B, a product-related may be received at a television and/or any other above described device such that information associated with the product identifier may be displayed at such device. Of course it is noted that other systems and architectures could be implemented such that a product identifier may be received for information associated with the product identifier to be displayed.

Figure 2:
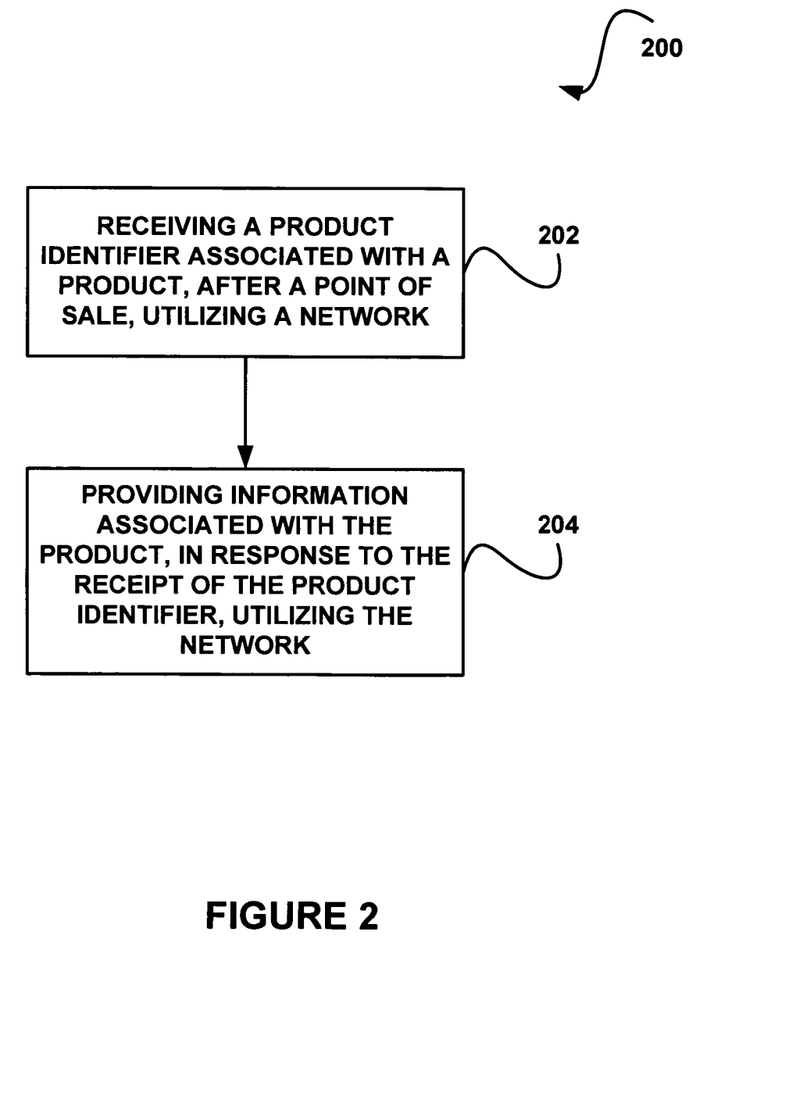
FIG. 2 illustrates a method for providing information in response to receiving a product identifier, in accordance with one embodiment.

FIG. 2 illustrates a method for providing information in response to receiving a product identifier, in accordance with one embodiment. As an option, the method 200 may be implemented in the context of the details of FIGS. 1A and 1B. Of course, however, the method 200 may be carried out in any desired environment. Further, the aforementioned definitions may equally apply to the description below.

As shown in operation 202, a product identifier associated with a product is received, after a point of sale, utilizing a network. The network may include the networks described below with respect to FIG. 5, but, of course, may include any type of network capable of allowing a product identifier to be received. Since the product is received after a point of sale (i.e. after a sale of the product has been completed, etc.), the product may include any product that has been purchased by a user.

In the context of the embodiment of FIGS. 1A-1B, the product identifier may be provided by a product identifier reader. Of course, it should be noted that the product identifier may be received in any desired manner. Still yet, the product identifier may be received at a server computer, a HNED (see, for example, FIGS. 1A-1B), and/or any device(s) (e.g. see, for example, the devices described below during reference to FIG. 5, etc.) capable of performing the operations of the method 200.

In response to the receipt of the product identifier in operation 202, information associated with the product is provided utilizing the network, as in operation 204. Such information may be provided to a user of the product, a purchaser of the product, any other person in control of the product identifier, and/or any other person, for that matter. Again, in some embodiments, the information may be provided utilizing a HNED (see, for example, FIGS. 1A-1B), but, of course, may be provided to a user utilizing any type of device capable of providing such information (e.g. see, for example, the devices described below during reference to FIG. 5, etc.). In any case, the information may include any visual and/or audible content, information associated with content, and/or any other information associated with the product, etc.

More illustrative information will now be set forth regarding various optional architectures and uses in which the foregoing method 200 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
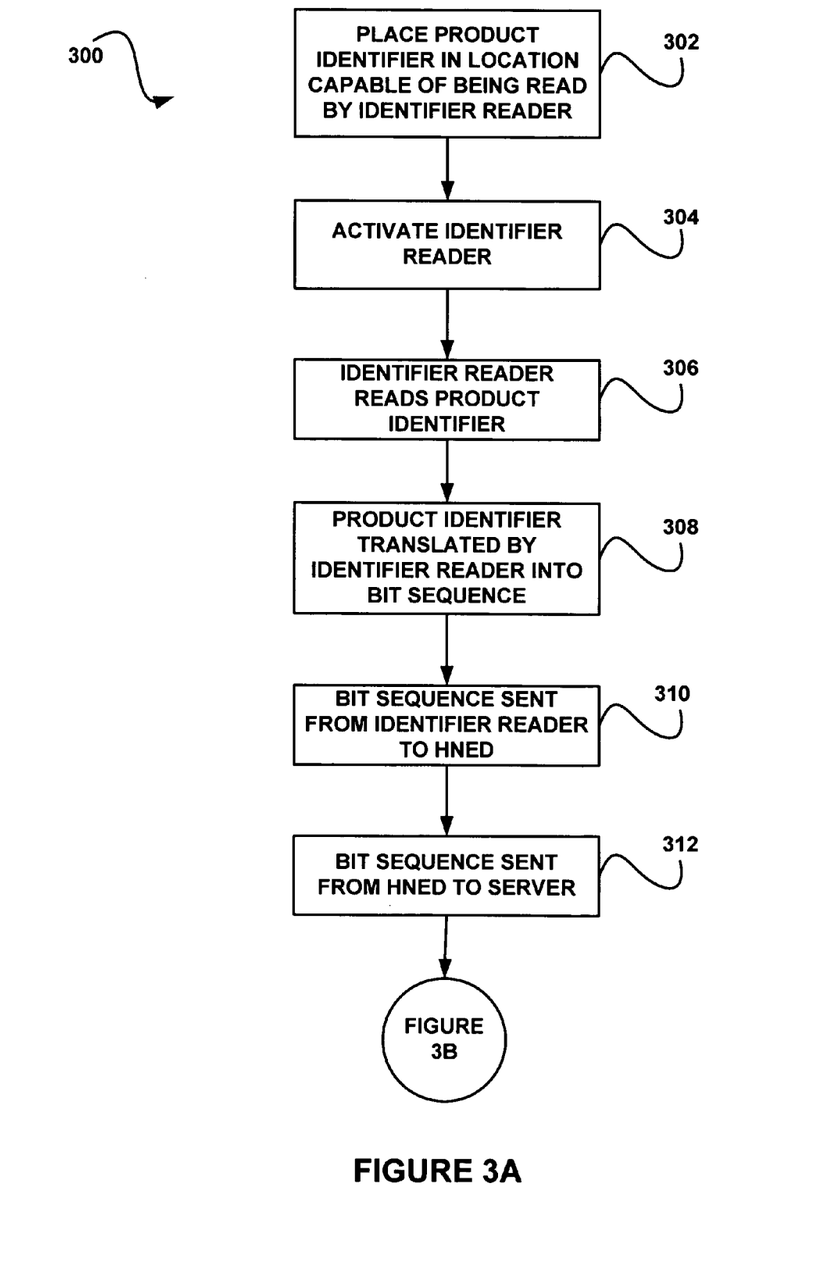
FIGS. 3A and 3B illustrate a method for providing information in response to receiving a product identifier, in accordance with another embodiment.
Figure 3B:
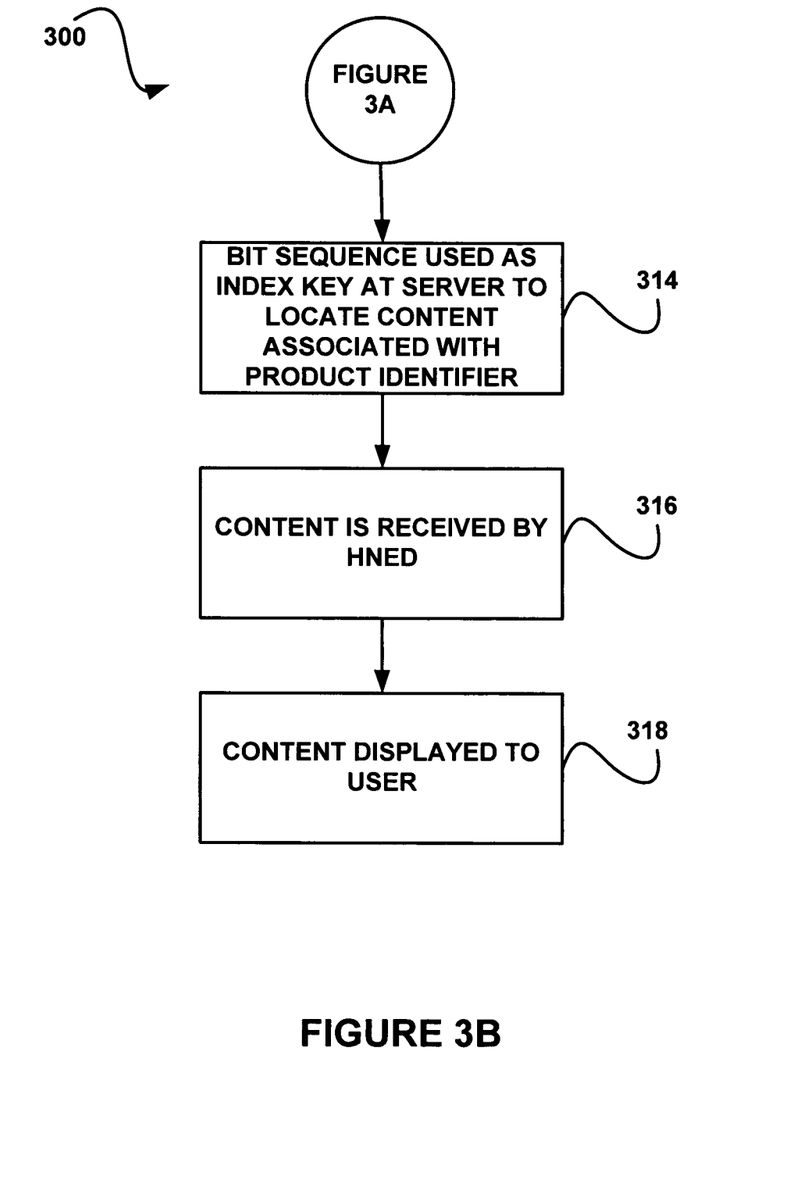

FIGS. 3A and 3B illustrate a method 300 for providing information in response to receiving a product identifier, in accordance with another embodiment. As an option, the method 300 may be implemented in the context of the details of FIGS. 1A-2. Of course, however, the method 300 may be carried out in any desired environment. Further, the aforementioned definitions may equally apply to the description below.

As shown in operation 302 of FIG. 3A, a product identifier is placed in a location capable of being read by an identifier reader. Thus, if the product identifier is included in the product, the product itself may be placed in a location capable of allowing the product identifier to be read by the identifier reader. Of course, if the product identifier is located on a tag or sales receipt of the product, such tag or sales receipt may be placed in a location capable of allowing the product identifier to be read by the identifier reader. Just by way of example, the product identifier may be placed in front of the identifier reader in order for the product identifier to be read.

Upon the identifier reader locating the product identifier, the identifier reader is activated, as in operation 304. Such activation may include starting up the identifier reader from a sleep mode. In this way, the identifier reader may only run when a user places a product identifier in a location such that the identifier reader can read the product identifier. Further, the activation may include tuning the identifier reader to a dedicated RFID channel so that it is capable of reading the product identifier.

Once activated, the identifier reader then reads the product identifier. See operation 306. As described above with respect to FIGS. 1A and 1B, the identifier reader may optionally read the product identifier utilizing an RFID. For example, the identifier reader may include an RFID reader that reads an RFID tag of the product identifier.

As shown in operation 308, the read product identifier is translated into a bit sequence by the identifier reader. In some embodiments, the product identifier may be sent from the identifier reader to any local and/or remote device capable of translating the product identifier into a bit sequence. Of course, the identifier reader itself may optionally be capable of the foregoing translation.

In use, the bit sequence may identify the product associated with the product identifier, such as a unique product identifier. In addition, the bit sequence may identify the specific product, such as the serial number of the product, the production date of the associated product, the expiration date of the associated product, and/or any other information associated with the specific product.

The bit sequence is then sent to an HNED, as in operation 310. As described above with respect to FIGS. 1A and 1B, the HNED may include a television, a set-top box, and/or any other desired device. From the HNED, the bit sequence is sent to a server. Note operation 312. The server may include any device capable of storing bit sequences and their associated content in a database.

At the server, the bit sequence is used as an index key to locate information associated with the product identifier, as shown in operation 314. Note FIG. 3B. Thus, as an example, the bit sequence may be looked up in a database, where the database includes bit sequences associated with content information. Such content information may include television content, web content, audio content, and/or any other type of content capable of being associated with a product. Furthermore, the content information may include information on a location of content associated with the product, such that the database does not itself store the actual content associated with the product, but only a location (e.g. address, etc.) of the content associated with the product.

The located content information is then received by the HNED, as indicated in operation 316. The located content information may be pushed onto the HNED by the server, or may be pulled from the server by the HNED. Additionally, the HNED may even tune to the located content information. To this end, the received content information may then be displayed to a user, as shown in operation 318. Of course, such content may be displayed utilizing any of the devices described with respect to FIG. 5, along with any other devices capable of displaying such content to a user.

The above described embodiments may be used for providing information to a user in response to a product identifier. They may also be utilized for gathering information on purchases made by a user, such that related advertisements may be displayed to the user. For example, related advertisements may be played linearly or along with any content provided to the user. Furthermore, the received product identifier may provide information on a place and time that a user purchased the product associated with the product identifier, and such information may be correlated with specific advertisements that may have been presented to the user during that time. In turn, such advertisements may be received by the HNED and replayed to the user.

Figure 4:
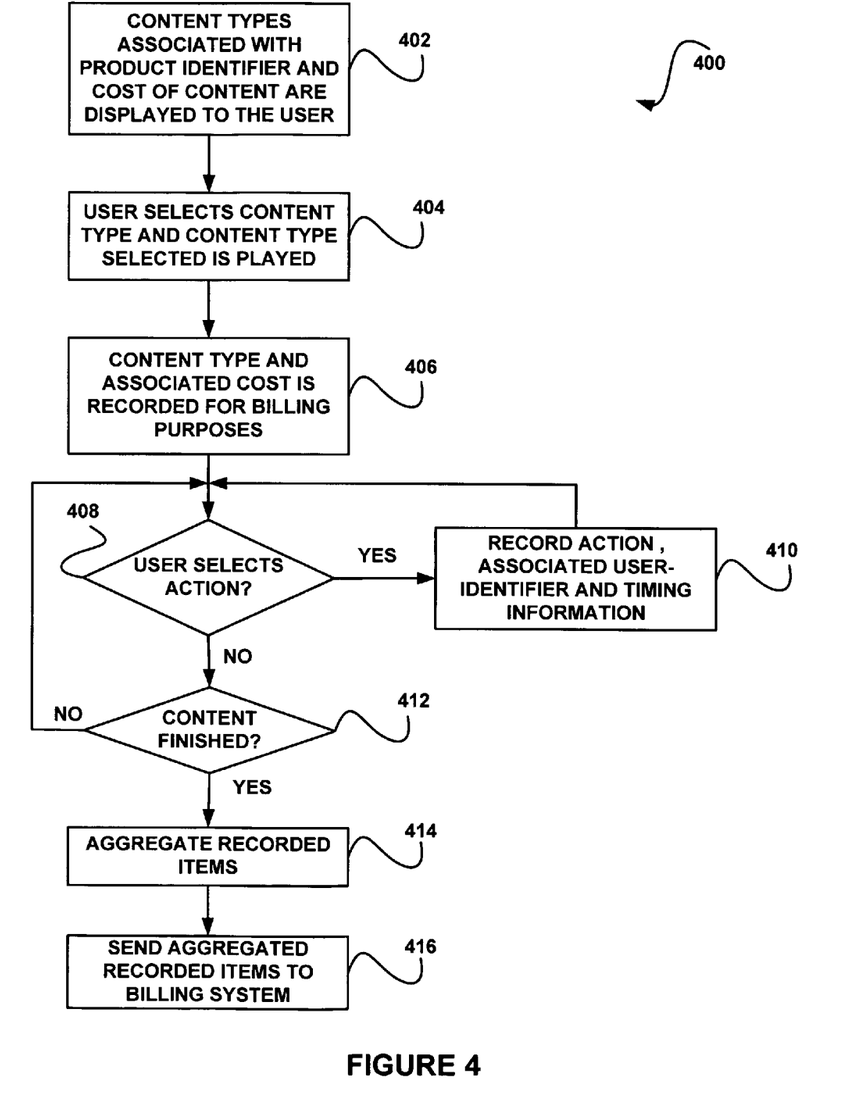
FIG. 4 illustrates a method for charging a user for information provided in response to receiving a product identifier, in accordance with yet another embodiment.

FIG. 4 illustrates a method 400 for charging a user for information provided in response to receiving a product identifier, in accordance with yet another embodiment. As an option, the method 400 may be implemented in the context of the details of FIGS. 1A-3. Of course, however, the method 400 may be carried out in any desired environment. Further, the aforementioned definitions may equally apply to the description below.

Initially, content types associated with a product identifier along with the cost of such content types are displayed to a user, as shown in operation 402. Such content types may be the located content information received by the HNED in operation 316 of FIG. 3, for example. Of course, it should be noted that the content types may include any received content types capable of being associated with a cost and displayed to a user. Thus, for example, if a user purchases self-assemble furniture, a product identifier of the furniture may be read, and an assembly video manual title and associated cost may be displayed to a user via a computer, television, and/or any other device capable of displaying such information.

In some embodiments, such content types and associated costs may be broadcasted to a user utilizing any audio mechanism capable of broadcasting content. Furthermore, only content types associated with the product identifier are displayed, such that only one content type may be displayed or a plurality of content types may be displayed depending on how many content types are associated with the specific product identifier. Still yet, the cost may include an amount that the user may be billed if the user selects the content type to be played.

The displayed content types are then played as content in accordance with a selection made by a user, as in operation 404. Thus, in the example provided above, if the user selects the furniture assembly video manual title, such video manual may be played for the user via the device displaying the content type. As indicated in operation 406, such played content and associated cost are recorded for billing purposes. In this way, a user may select which content he desires to be played and then may be billed for that content.

During play of the content, the user may also have the option of taking specific actions in association with the played content. Such actions may optionally be recorded, and may include, for example, fast-forwarding the played content, rewinding the played content, pausing the played content, stopping the played content, and/or re-playing the played content after any of the foregoing actions. Of course, such actions are not limited to those described above, and may further include any actions capable of being taken in association with the played content.

Specifically, as shown in decision 408, while the content is being played, it is determined whether the user has selected an action. If the user has selection an action, such action is recorded along with a user identifier associated with the action and a timing of the action. See operation 410.

A cost for the action may also be recorded, where such cost is optionally calculated based on a plurality of parameters. For example, such parameters may be derived from the product identifier associated with the action, and may include a product serial number, a product date, and/or any other information capable of being derived from the product identifier. Thus, the costs of actions may be based on the specific type of content played and/or on the specific product identifier.

As another option, content types associated with a product identifier along with a payment for such content types may be displayed to a user. Thus, content types may be associated with payments that will be made to the user for selecting the particular content type. For example, an advertiser may desire to pay a user for watching the advertiser's content. In one instance, such content may be an advertisement of the advertiser. In this way, when a user selects content associated with payments, the payment for the content may be recorded. Furthermore, a payment for each action taken by the user in response to the content may be recorded in a similar manner. For example, the user may be paid for navigating through interactive content displayed to the user. In use, the advertiser may pay the user by crediting a user's account through the aggregated billing information described below.

After such information is recorded, the method 400 returns to decision 408 to determine if a user has selected another action. If the user does not select an action, it is determined if the played content is finished, as shown in decision 412. Such content may automatically be finished playing if the end of the content has been reached or if the user manually terminates the playing of the content.

If the content is not finished, the method 400 returns to operation 408 to determine if a user has selected an action. Otherwise, the method 400 returns to operation 414, as described below. In this way, the method 400 may continuously poll the played content to determine whether an action has been performed by a user up until the content has finished playing.

Upon the termination of the played content, the recorded information is aggregated, as shown in operation 414. Such aggregated information may include the content type selected by the user, the cost of the selected content type, and/or the actions taken by the user in association with the content type. Furthermore, as indicated in operation 416, the aggregated information may be sent to a billing system for billing the user. Thus, as described in the above embodiment, a user may be provided with the opportunity to select content associated with a product identifier and may be billed for such content, any functionality utilized by the user in association with such content, etc.

Figure 5:
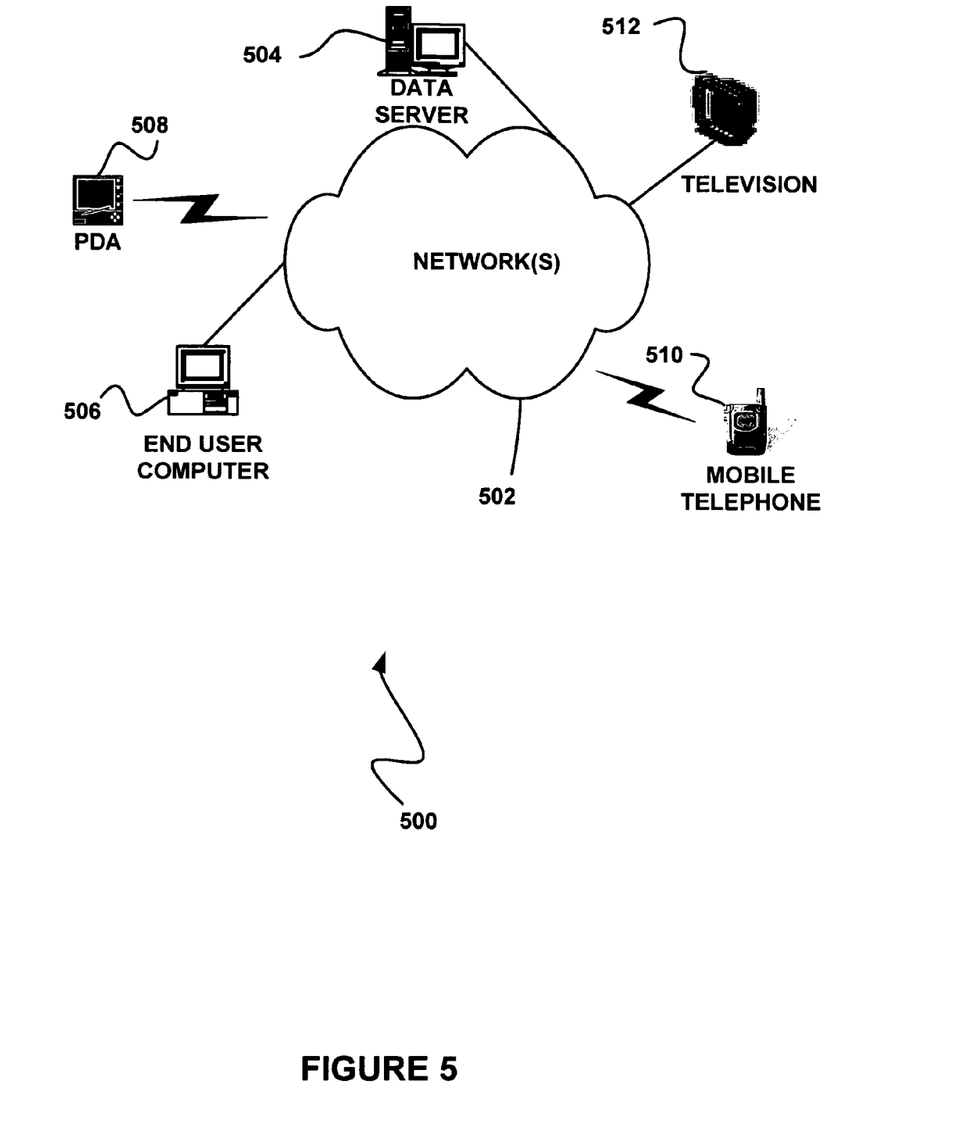
FIG. 5 illustrates a network architecture, in accordance with one embodiment.

FIG. 5 illustrates a network architecture 500, in accordance with one embodiment. As an option, the present network architecture 500 may be implemented in the context of the architecture and environment of FIGS. 1A-4.

As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

It should be noted that any of the foregoing devices in the present network architecture 500, as well as any other unillustrated hardware and/or software, may be equipped with the capability of providing information in response to receiving a product identifier.

Figure 6:
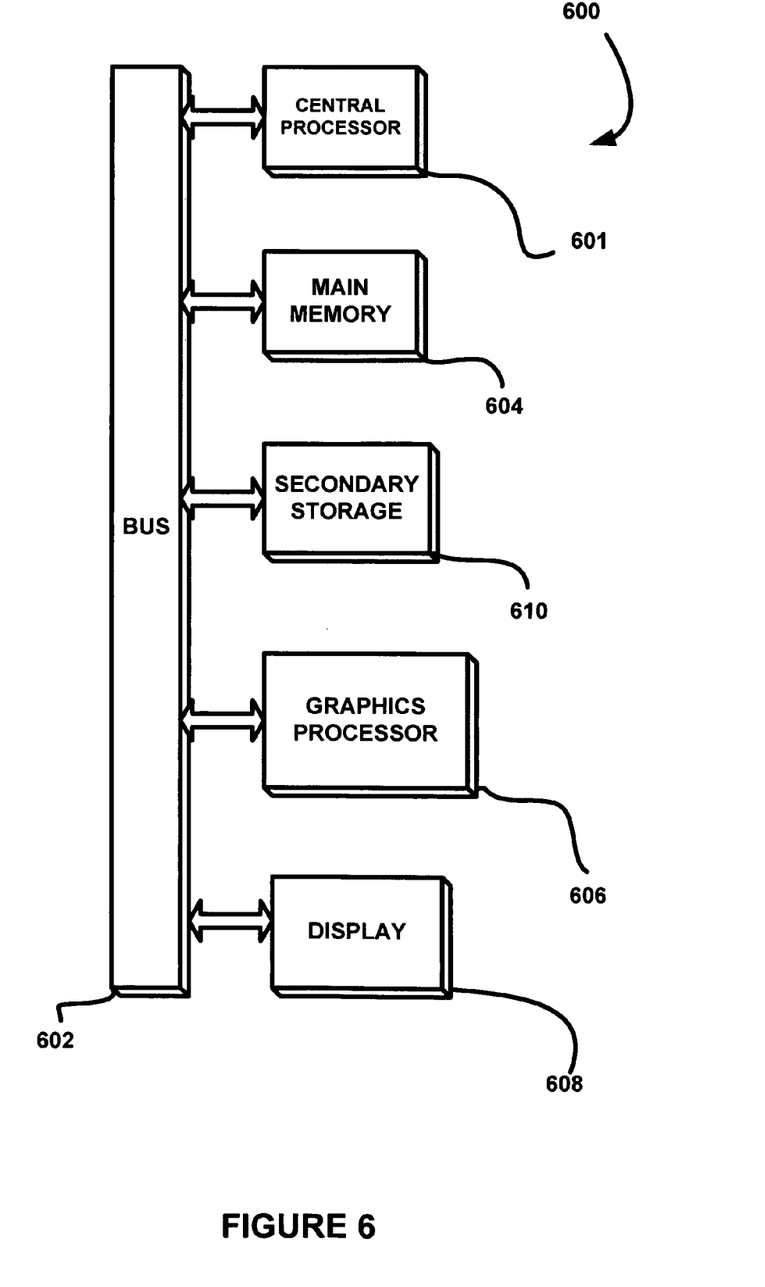
FIG. 6 illustrates an exemplary computer system, in accordance with one embodiment.

FIG. 6 illustrates an exemplary computer system 600, in accordance with one embodiment. As an option, the computer system 600 may be implemented in the context of any of the devices of the network architecture 500 of FIG. 5. Of course, the computer system 600 may be implemented in any desired environment.

As shown, a computer system 600 is provided including at least one central processor 601 which is connected to a communication bus 602. The computer system 600 also includes main memory 604 [e.g. random access memory (RAM), etc.]. The computer system 600 also includes a graphics processor 606 and a display 608.

The computer system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the computer system 600 to perform various functions. Memory 604, storage 610 and/or any other storage are possible examples of computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    receiving a product identifier associated with a product, after a point of sale, utilizing a network;
    providing information associated with the product, in response to the receipt of the product identifier, utilizing a processor and the network;
    correlating the information with at least one advertisement that was previously presented to a user during time of purchase; and
    receiving and replaying the at least one previously presented advertisement to the user;
    wherein the information associated with the product includes at least one content type, a cost or payment associated with the at least one content type, and a place and time that the user purchased the product associated with the product identifier;
    wherein the at least one content type and the cost or payment are recorded upon the user selecting the at least one content type;
    wherein actions by the user in association with the selected at least one content type are recorded;
    wherein a cost or payment for the actions are calculated based on a plurality of parameters;
    wherein the point of sale includes a completion of a sale of the product;
    wherein the product identifier is received utilizing a remote control;
    wherein the remote control includes an identifier reader that is started up from a sleep mode when the user places the product identifier in a location such that the identifier reader of the remote control can read the product identifier.

2. The method as recited in claim 1, wherein the product identifier is received utilizing a home network end device (HNED).

3. The method as recited in claim 1, wherein the product identifier is received utilizing a radio frequency identification device (RFID) reader.

4. The method as recited in claim 1, wherein the remote control includes a radio frequency identification device (RFID) reader.

5. The method as recited in claim 1, wherein the product identifier includes a radio frequency identification device (RFID) tag coupled to the product.

6. The method as recited in claim 5, wherein the RFID tag is located on a label of the product.

7. The method as recited in claim 1, wherein the information associated with the product includes television content.

8. The method as recited in claim 1, and further comprising translating the product identifier into a bit sequence after receiving the product identifier.

9. The method as recited in claim 8, and further comprising sending the bit sequence to a server via the network, and utilizing the bit sequence as an index to locate on the server the information associated with the product.

10. The method as recited in claim 1, wherein the information associated with the product is provided to the user of the product utilizing a home network end device (HNED).

11. The method as recited in claim 1, wherein the actions include at least one of fast-forward, rewind, pause, play, and stop.

12. The method as recited in claim 1, wherein the recorded at least one content type, cost or payment, and actions are aggregated.

13. The method as recited in claim 12, wherein the aggregation is sent to a billing system.

14. The method as recited in claim 1, wherein the parameters are derivable from the product identifier, and include at least one of a product serial number and a product date.

15. A computer program product embodied on a tangible computer readable medium, comprising:
    computer code for receiving a product identifier associated with a product, after a point of sale, utilizing a network;
    computer code for providing information associated with the product, in response to the receipt of the product identifier, utilizing the network;
    computer code for correlating the information with at least one advertisement that was previously presented to a user during a time of purchase; and
    computer code for receiving and replaying the at least one previously presented advertisement to the user;
    wherein the information associated with the product includes at least one content type, a cost or payment associated with the at least one content type, and a place and time that the user purchased the product associated with the product identifier;
    wherein the computer program product is operable such that the at least one content type and the cost or payment are recorded upon the user selecting the at least one content type;
    wherein the computer program product is operable such that actions by the user in association with the selected at least one content type are recorded;
    wherein the computer program product is operable such that a cost or payment for the actions are calculated based on a plurality of parameters;
    wherein the point of sale includes a completion of a sale of the product;
    wherein the computer program product is operable such that the product identifier is received utilizing a remote control;
    wherein the remote control includes an identifier reader that is started up from a sleep mode when the user places the product identifier in a location such that the identifier reader of the remote control can read the product identifier.

16. A system including a tangible computer readable medium, comprising:
    logic executable by a processor for receiving a product identifier associated with a product, after a point of sale, utilizing a network;
    logic executable by a processor for providing information associated with the product, in response to the receipt of the product identifier, utilizing the network;

logic executable by a processor for correlating the information with at least one advertisement that was previously presented to a user during a time of purchase; and logic executable by a processor for receiving and replaying the at least one previously presented advertisement to the user;

wherein the information associated with the product includes at least one content type, a cost or payment associated with the at least one content type, and a place and time that the user purchased the product associated with the product identifier;

wherein the system is operable such that the at least one content type and the cost or payment are recorded upon the user selecting the at least one content type;

wherein the system is operable such that actions by the user in association with the selected at least one content type are recorded;

wherein the system is operable such that a cost or payment for the actions are calculated based on a plurality of parameters;

wherein the point of sale includes a completion of a sale of the product;

wherein the system is operable such that the product identifier is received utilizing a remote control;

wherein the remote control includes an identifier reader that is started up from a sleep mode when the user places the product identifier in a location such that the identifier reader of the remote control can read the product identifier.

17. The method as recited in claim 1, wherein the at least one content type is associated with payments that will be made to the user for selecting the at least one content type.

18. The method as recited in claim 1, wherein the product identifier includes a radio frequency identification device (RFID) tag on a sales receipt for the product.

19. The method as recited in claim 1, wherein the parameters used for calculating the cost or payment for the actions are derived from the product identifier that includes a product serial number and a product production date.

* * * * *